(12) United States Patent
Matsuishi

(10) Patent No.: US 7,464,327 B2
(45) Date of Patent: Dec. 9, 2008

(54) WEB PAGE CREATION APPARATUS, WEB PAGE CREATION METHOD, WEB PAGE CREATION PROGRAM, AND RECORDING MEDIUM

(75) Inventor: Takaya Matsuishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 427 days.

(21) Appl. No.: 10/820,028

(22) Filed: Apr. 8, 2004

(65) Prior Publication Data

US 2004/0205665 A1    Oct. 14, 2004

(30) Foreign Application Priority Data

Apr. 11, 2003    (JP)    ............... 2003-108300
Mar. 16, 2004    (JP)    ............... 2004-074963

(51) Int. Cl.
    *G06F 17/00*    (2006.01)
(52) U.S. Cl. .............. 715/234; 715/745; 715/748; 715/789; 707/1; 707/200
(58) Field of Classification Search ........... 715/517, 715/526, 234, 745, 748, 789; 707/1, 200
    See application file for complete search history.

(56) References Cited

U.S. PATENT DOCUMENTS

| | | | |
|---|---|---|---|
| 6,476,833 B1 * | 11/2002 | Moshfeghi | ............... 715/854 |
| 6,990,574 B2 * | 1/2006 | Bidarahalli et al. | ............ 713/2 |
| 2002/0036793 A1 | 3/2002 | Roosen et al. | |
| 2002/0059288 A1 | 5/2002 | Yagi et al. | |
| 2003/0011801 A1 | 1/2003 | Simpson et al. | |
| 2003/0140115 A1 * | 7/2003 | Mehra | ............... 709/217 |

FOREIGN PATENT DOCUMENTS

| | | |
|---|---|---|
| EP | 1 209 851 | 5/2002 |
| JP | 2004-13414 | 1/2004 |

OTHER PUBLICATIONS

H. W. Schilling, Internet Article. ACM SIGCHI www Human Factors, Open Discussion. CHI-Web Archives, 'Online!, http://listserv.acm.org/scripts/wa.exe?A2=ind9912b&L=chi-web&F=&s=&p=3036, XP-002293378, 1 page, "Is Putting a Recently Visited Page Menu a Good Idea for Web Sites?", Dec. 13, 1999.

(Continued)

*Primary Examiner*—Stephen Hong
*Assistant Examiner*—Matthew J Ludwig
(74) *Attorney, Agent, or Firm*—Oblon, Spivak, McClelland, Maier & Neustadt, P.C.

(57) ABSTRACT

In a Web page creation apparatus, a request-related information management unit manages request-related information items related to processing requests received from an external device which is connected with the Web page creation apparatus through a network. A request-related information recording unit records a request-related information item in the request-related information management unit in response to a processing request. A Web page creation unit creates a Web page with which a user interface corresponding to the request-related information item concerned is displayed based on the request-related information item recorded in the request-related information management unit by the request-related information recording unit.

18 Claims, 21 Drawing Sheets

OTHER PUBLICATIONS

M. Andrew, Internet Article. Oracle Corp. White Paper, 'Online!, http://portalstudio.oracle.com/pls/ops/docs/FOLDER/COMMUNITY/OTN_CONTENT/MAINPAGE/KEYFEATURES_BENEFITS/PORTAL_V2_TWP_FINAL/PDF, XP-002293377, pp. 1-30, "Oracle9IAS Portal Release 2-Technical Overview", Apr. 2002.

G. Hildebrandt, Internet Article. Brandenburg University of Technology at Cottbus. Institut for Bauinformatik, 'Online!, http://dcms.bauinf.tu-cottbus.de/docs/dcms.pdf, XP-002293376, pp. 1-22, "Web-Based Document Management", Apr. 2001.

U.S. Appl. No. 09/632,212, filed Aug. 3, 2000, Kumashio et al.

U.S. Appl. No. 10/601,645, filed Jun. 24, 2003, Matsuishi.

U.S. Appl. No. 10/691,691, filed Oct. 24, 2003, Matsuishi.

U.S. Appl. No. 10/820,028, filed Apr. 8, 2004, Matsuishi.

\* cited by examiner

FIG.7

```
<?xml version="1.0" encoding="UTF-8"?>
<Profile>
    <TreeView>
        <RootNode ServiceURI=http://xxx./cabinetA>
            CABINET-A
        </RootNode>
        <RootNode ServiceURI=http://xxx/cabinetB>
            CABINET-B
        </RootNode>
    </TreeView>
</Profile>
```

191

1911 { `<RootNode ServiceURI=http://xxx./cabinetA>` / CABINET-A / `</RootNode>` } 1911a 1912 { `<RootNode ServiceURI=http://xxx/cabinetB>` / CABINET-B / `</RootNode>` } 1912a

FIG.9

```
<?xml version="1.0" encoding="UTF-8"?>
<Profile>
    <TreeView>
        <RootNode ServiceURI=http://xxx./cabinetA>
1911        CABINET-A
        </RootNode>
        <RootNode ServiceURI=http://xxx/cabinetB>
1912        CABINET-B
        </RootNode>
        <RootNode ServiceURI=http://xxx/cabinetC>
1913        CABINET-C
        </RootNode>

</TreeView>
</Profile>
```

```
<?xml version="1.0" encoding="UTF-8"?>
<Profile>
    <PrinterList>
        <Printer IPAddress="xxx.xxx.xxx.aaa">
            PRINTER-A
        </Printer>
        <Printer IPAddress="xxx.xxx.xxx.bbb">
            PRINTER-B
        </Printer>
        <Printer IPAddress="xxx.xxx.xxx.ccc">
            PRINTER-C
        </Printer>
    </PrinterList>
</Profile>
```

191

1915 — Printer-A block
1916 — Printer-B block
1917 — Printer-C block

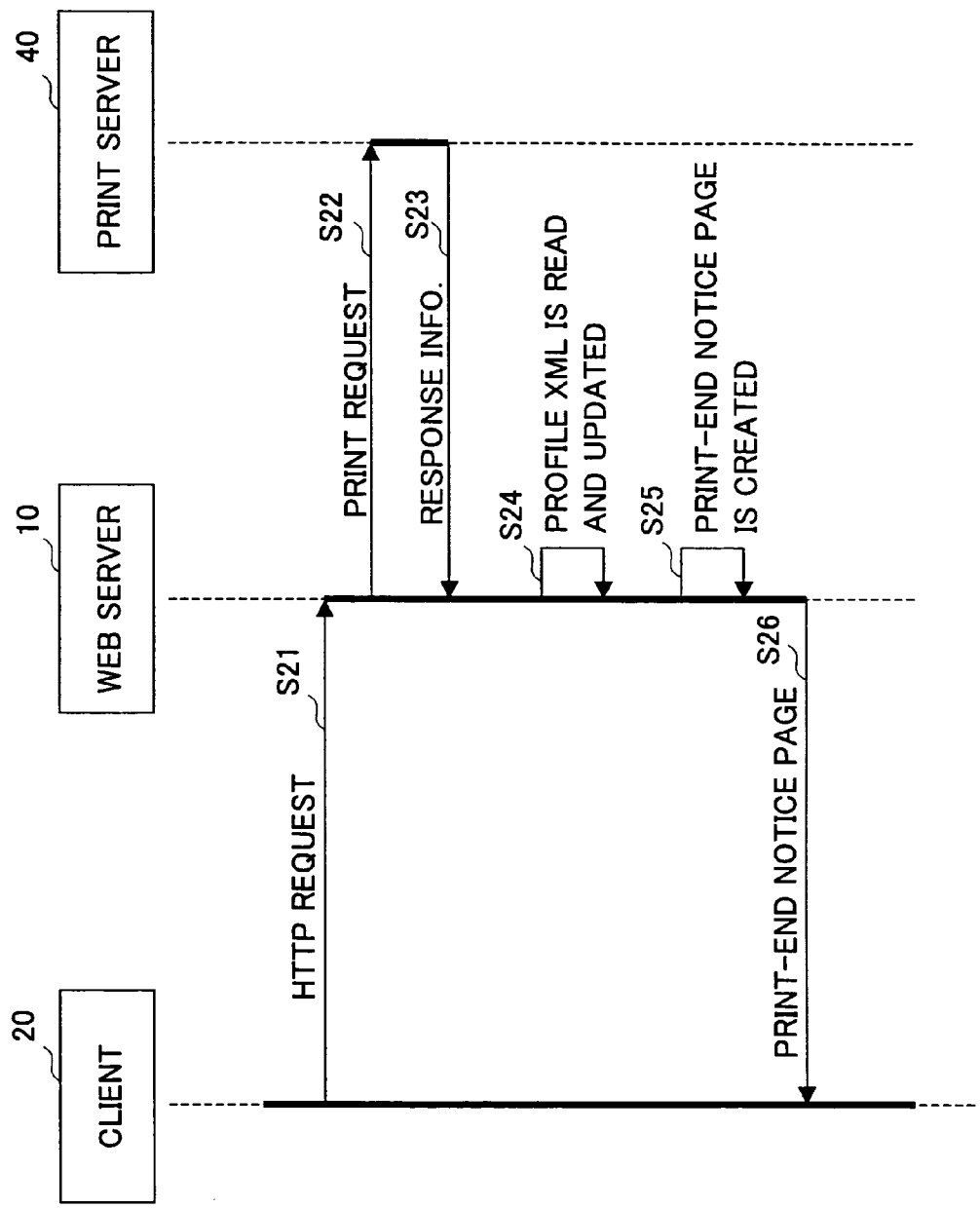

FIG.16

```
<?xml version="1.0" encoding="UTF-8"?>
<Profile>
    <PrinterList>
        <Printer IPAddress="xxx.xxx.xxx.aaa">
            PRINTER-A
        </Printer>
        <Printer IPAddress="xxx.xxx.xxx.bbb">
            PRINTER-B
        </Printer>
        <Printer IPAddress="xxx.xxx.xxx.ccc">
            PRINTER-C
        </Printer>
        <Printer IPAddress="xxx.xxx.xxx. ddd">
            PRINTER-D
        </Printer>
    </PrinterList>
</Profile>
```

1915: PRINTER-A block
1916: PRINTER-B block
1917: PRINTER-C block
1918: PRINTER-D block
191

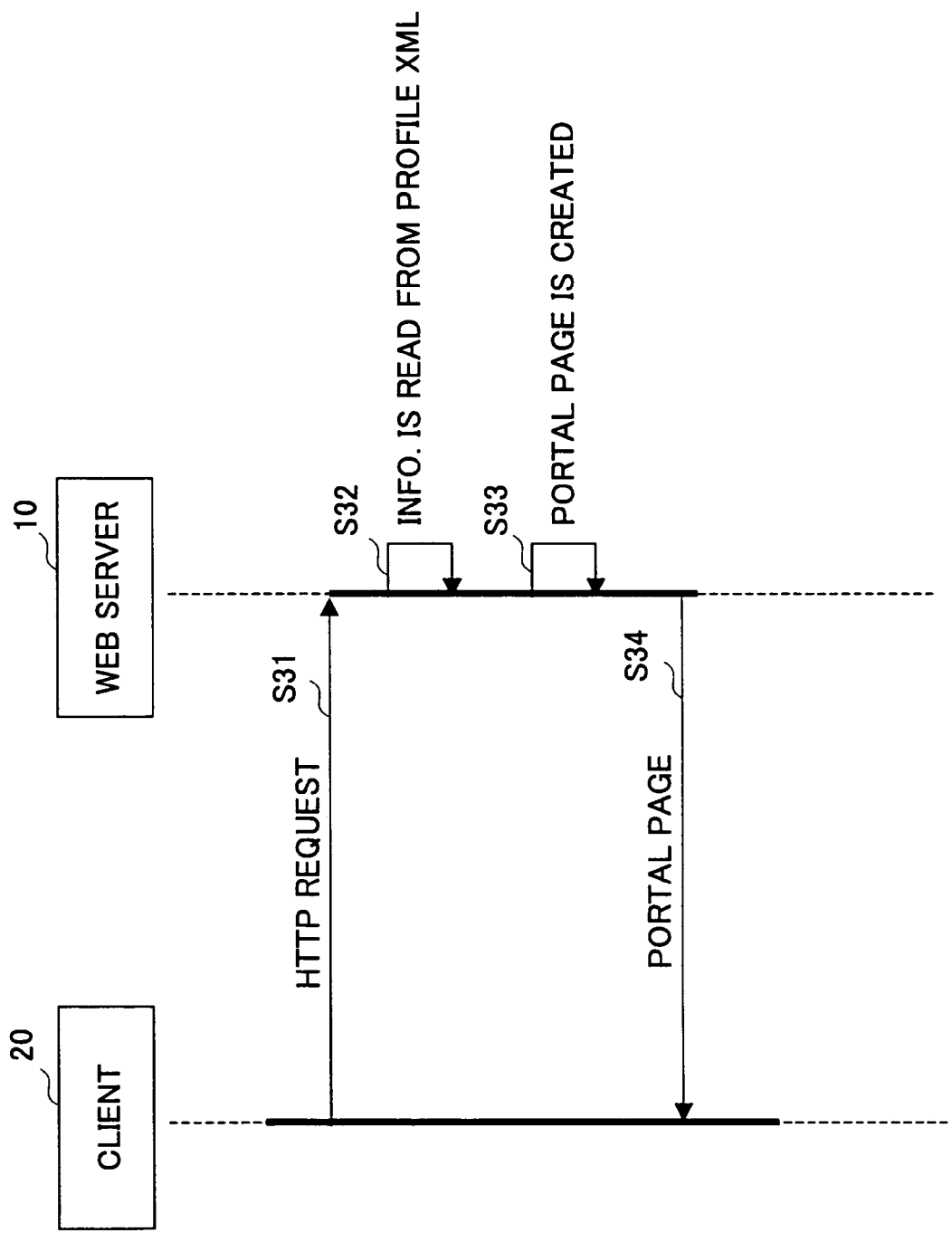

WEB PAGE CREATION APPARATUS, WEB PAGE CREATION METHOD, WEB PAGE CREATION PROGRAM, AND RECORDING MEDIUM

BACKGROUND OF THE INVENTION

1. Field of the Invention

The present invention relates to a Web page creation apparatus, a Web page creation method, a Web page creation program and a recording medium for creating a Web page which is displayed on a computer connected through a network.

2. Description of the Related Art

With the development of Web technology in recent years, it has become possible for the user to use various services through the Web pages. What is needed for the user to use a desired service through the Web page is to input a URL of the Web page concerned into the web browser.

The URL is generally comprised of a relatively large number of characters, and it is difficult to memorize such URLs of various Web pages. Therefore, as for the URLs of the Web page that are frequently used again, they may be memorized using the bookmark function currently provided by the web browser.

By using the bookmark function, the user does not need to memorize the long URLs, and the previously used Web page can be displayed on the web browser easy operations (e.g., selection of the menu, etc.).

However, if too many URLs are recorded using the bookmark function, there is the problem that it becomes difficult to discover the desired Web page from among the various bookmarks of the menu shortly. As a result, the user cannot discover it out of the bookmarks of the menu. In such a case, the user often inputs the URL again.

Moreover, in order to register a new URL into the bookmark, the user needs to perform operation for registering the URL. This not only requires for the user to perform a relatively complicated operation, but also may cause the user to forget the registered URL carelessly.

SUMMARY OF THE INVENTION

An object of the present invention is to provide an improved Web page creation apparatus and method in which the above-described problems are eliminated.

Another object of the present invention is to provide a Web page creation apparatus and method which creates a Web page with which the processing related to the previously used function can be easily performed.

The above-mentioned objects of the present invention are achieved by a Web page creation apparatus comprising: a request-related information management unit managing request-related information items related to processing requests received from an external device which is connected with the Web page creation apparatus through a network; a request-related information recording unit recording a request-related information item in the request-related information management unit in response to a processing request; and a Web page creation unit creating a Web page with which a user interface corresponding to the request-related information item concerned is displayed based on the request-related information item recorded in the request-related information management unit by the request-related information recording unit.

In the above-described Web page creation apparatus, the Web page is created based on the request-related information stored when the request-related information relevant to the predetermined processing request of the external device is stored and there is the request of the Web page separately, and the Web page can be created with which the processing relevant to the previously used function can be easily performed.

In addition, even if the Web page creation apparatus has the request related information management unit, it may be stopped, the predetermined information processor connected through the Web page creation apparatus and the network concerned may have it, and it should just be in the state which can access the Web page creation management device.

Moreover, the above-mentioned objects of the present invention are achieved by a Web page creation system including a Web page creation apparatus which creates a Web page displayed on an external device, and the external device which is connected with the Web page creation apparatus through a network, the Web page creation apparatus comprising: a request-related information management unit managing request-related information items related to processing requests received from the external device; a request-related information recording unit recording a request-related information item in the request-related information management unit in response to a processing request; and a Web page creation unit creating a Web page with which a user interface corresponding to the request-related information item concerned is displayed based on the request-related information item recorded in the request-related information management unit by the request-related information recording unit, the external device comprising a display unit which displays the Web page created by the Web page creation apparatus, on the display unit.

The above-mentioned objects of the present invention are achieved by a method of controlling Web page creation of a Web page creation apparatus, the method comprising steps of: recording a request-related information item in a request-related information management unit in response to a processing request, the request-related information management unit managing request-related information items related to processing requests received from an external device which is connected with the Web page creation apparatus through a network; and creating a Web page, in response to a request of acquisition of the Web page from the external device, with which a user interface corresponding to the request-related information item concerned is displayed based on the request-related information item recorded in the request-related information management unit in the recording step.

The above-mentioned objects of the present invention are achieved by a computer program product embodied therein for causing a computer to execute a Web page creation method which creates a Web page, the method comprising steps of: recording a request-related information item in a request-related information management unit in response to a processing request, the related-related information management unit managing request-related information items related to processing requests received from an external device which is connected with the Web page creation apparatus through a network; and creating a Web page, in response to a request of acquisition of the Web page from the external device, with which a user interface corresponding to the request-related information item concerned is displayed based on the request-related information item recorded in the request-related information management unit in the recording step.

The above-mentioned objects of the present invention are achieved by an information processing apparatus including a built-in communication device which communicates with an external device connected via a network, the apparatus comprising: a request-related information management unit managing request-related information items related to processing requests received from the external device; a request-related information recording unit causing the external device to perform processing related to a processing request through the communication device, and recording a request-related information item in the request-related information management unit in response to the processing request; a display data creation unit creating a display page with which a user interface corresponding to the request-related information item concerned is displayed based on the request-related information item recorded in the request-related information management unit by the request-related information recording unit; and a display unit displaying the display page created by the display data creation unit, on the display unit.

According to the present invention, it is possible to create the Web page with which the processing related to the previously used function can be easily performed.

BRIEF DESCRIPTION OF THE DRAWINGS

Other objects, features and advantages of the present invention will be apparent from the following detailed description when read in conjunction with the accompanying drawings.

FIG. 7 is a diagram showing an example of the definition of a profile XML in the Web server in the present embodiment.

FIG. 9 is a diagram showing an example of the definition of the profile XML to which the information corresponding to the cabinet-C is added.

FIG. 13 is a diagram showing an example of the definition of the profile XML in a second preferred embodiment of the Web page creation apparatus of the invention.

FIG. 15 is a sequence diagram for explaining the processing of the Web server in the present embodiment.

FIG. 16 is a diagram showing an example of the definition of the profile XML before updating in the present embodiment.

FIG. 17 is a sequence diagram for explaining the processing of the Web server to create the portal page.

DETAILED DESCRIPTION OF PREFERRED EMBODIMENTS

A description will now be provided of the preferred embodiments of the present invention with reference to the accompanying drawings.

Figure 1:
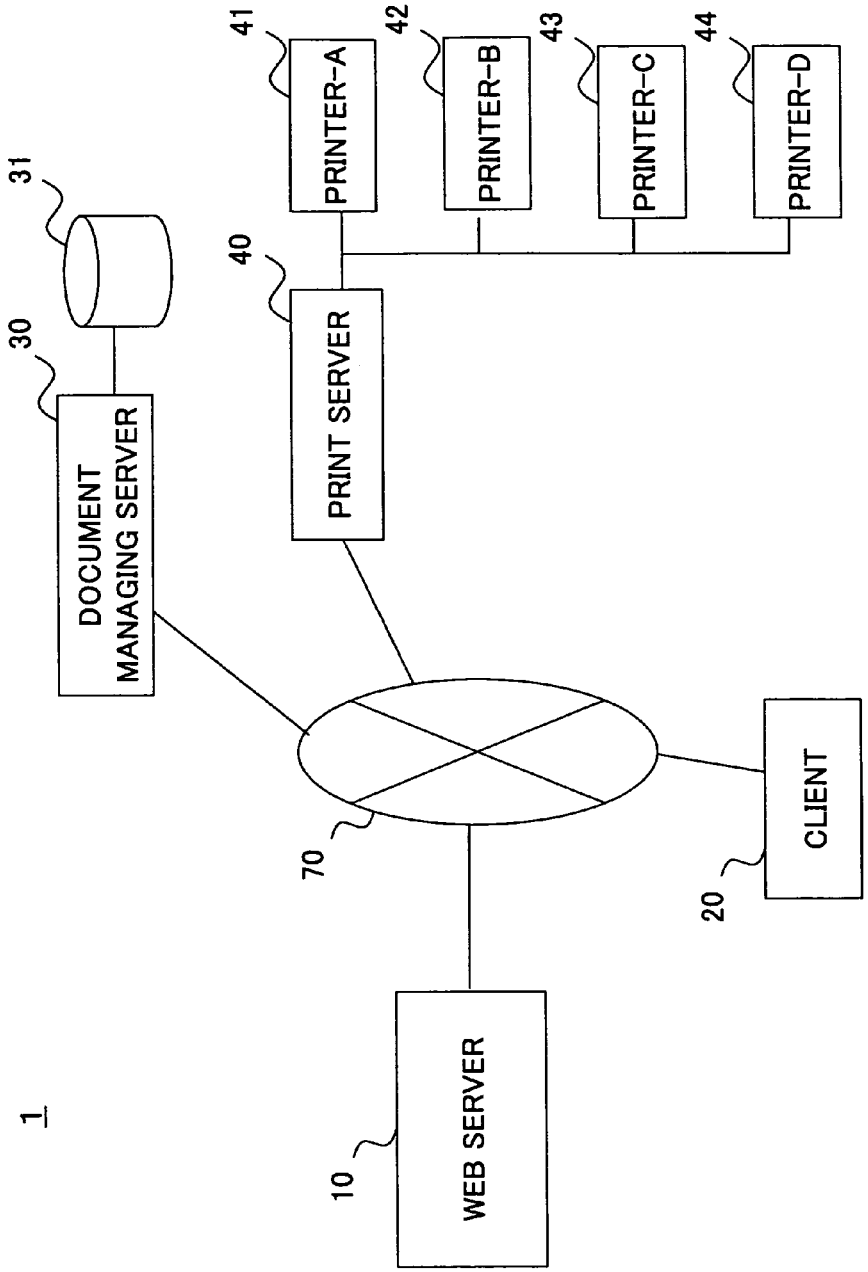
FIG. 1 is a block diagram of a Web system to which an embodiment of the Web page creation apparatus of the invention is applied.

FIG. 1 shows the composition of a Web system to which an embodiment of the Web page creation apparatus of the present invention is applied.

As shown in FIG. 1, the Web system 1 in this embodiment includes the Web server 10, the client 20, the document managing server 30 and the print server 40, and each component is connected through the network 70, such as the Internet or LAN (local area network).

The Web server 10 is the computer which creates a Web page with which the information requested by the client 20 is displayed, and provides the created Web page to the client 20.

The Web page in this meaning is the data of HTML or XML (extendible markup language) format which can be displayed by the general-purpose web browser, and extends to the structured document data for displaying data items described in a predetermined language, such as CHTML (compact HTML), WML (wireless markup language), etc.

The client 20 is a PC (personal computer), a PDA (personal digital assistant) or a communication terminal, such as a mobile phone, which is provided with the web browser for viewing the Web page provided by the Web server 10.

The document managing server 30 is the server provided with the document DB (database) 31 which is the database which manages document data, and provides the functions, such as the retrieval and updating of the document DB 31.

In the present embodiment, the document data in the document DB 31 are managed in a hierarchical structure using the concept of cabinets and folders as in a general-purpose document management system.

The cabinet is the concept of the uppermost layer (root) of the document data in the hierarchical structure. Two or more cabinets can be defined in the document DB 31, and one or more folders can be defined in each cabinet. The folder is the concept for managing a set of one or more document data. Other folders may be further defined in each folder.

Figure 2:
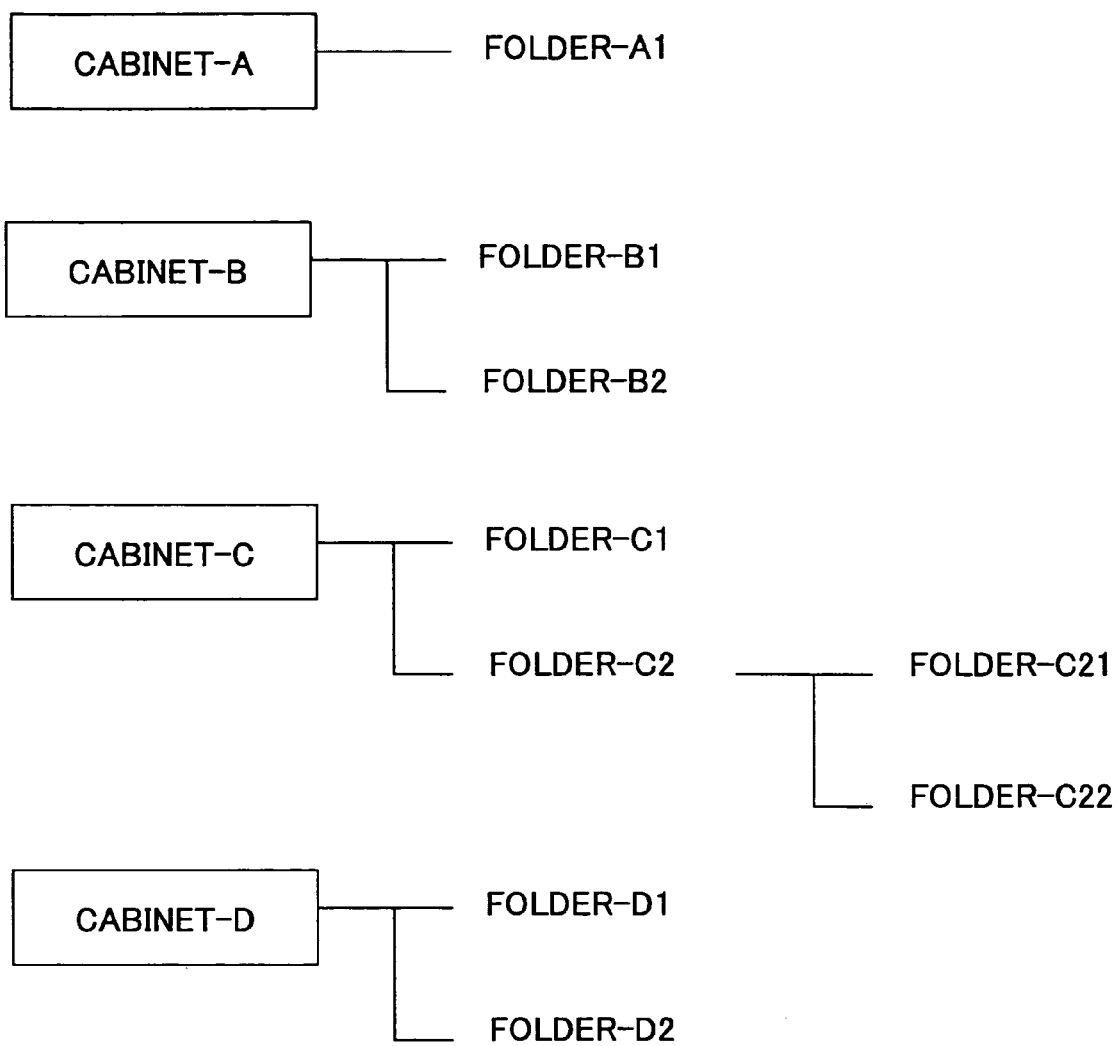
FIG. 2 is a diagram showing a composition of a document database in the Web system in the present embodiment.

In the present embodiment, the document information is defined as the document DB (database) 31 as shown in FIG. 2. FIG. 2 shows a composition of the document information of the document database 31 in the present embodiment.

As shown in FIG. 2, the document DB 31 in the present embodiment contains the four cabinets: cabinet-A, cabinet-B, cabinet-C, and cabinet-D, and each cabinet further contains one or more folders. In the example of FIG. 2, the document data recorded in each folder of the document DB 31 are omitted for the sake of convenience.

Referring back to FIG. 1, the print server 40 is the server which provides the printing function of document data.

When a printing request of document data is received from the network 70, the print server 40 causes the printer (or an image forming apparatus), designated by the printing request concerned among the printer-A 41, the printer-B 42, the printer-C 43, and the printer-D 44, to perform the printing of the document data concerned.

The document managing server 30 and the print server 40 provide the respective functions as the Web services to the network 70. Therefore, the client 20 can call the functions of the document managing server 30 and the print server 40 over the network 70 by using the RPC (remote procedure call) of the SOAP (simple object access protocol).

Next, a description will be given of the Web server 10.

Figure 3:
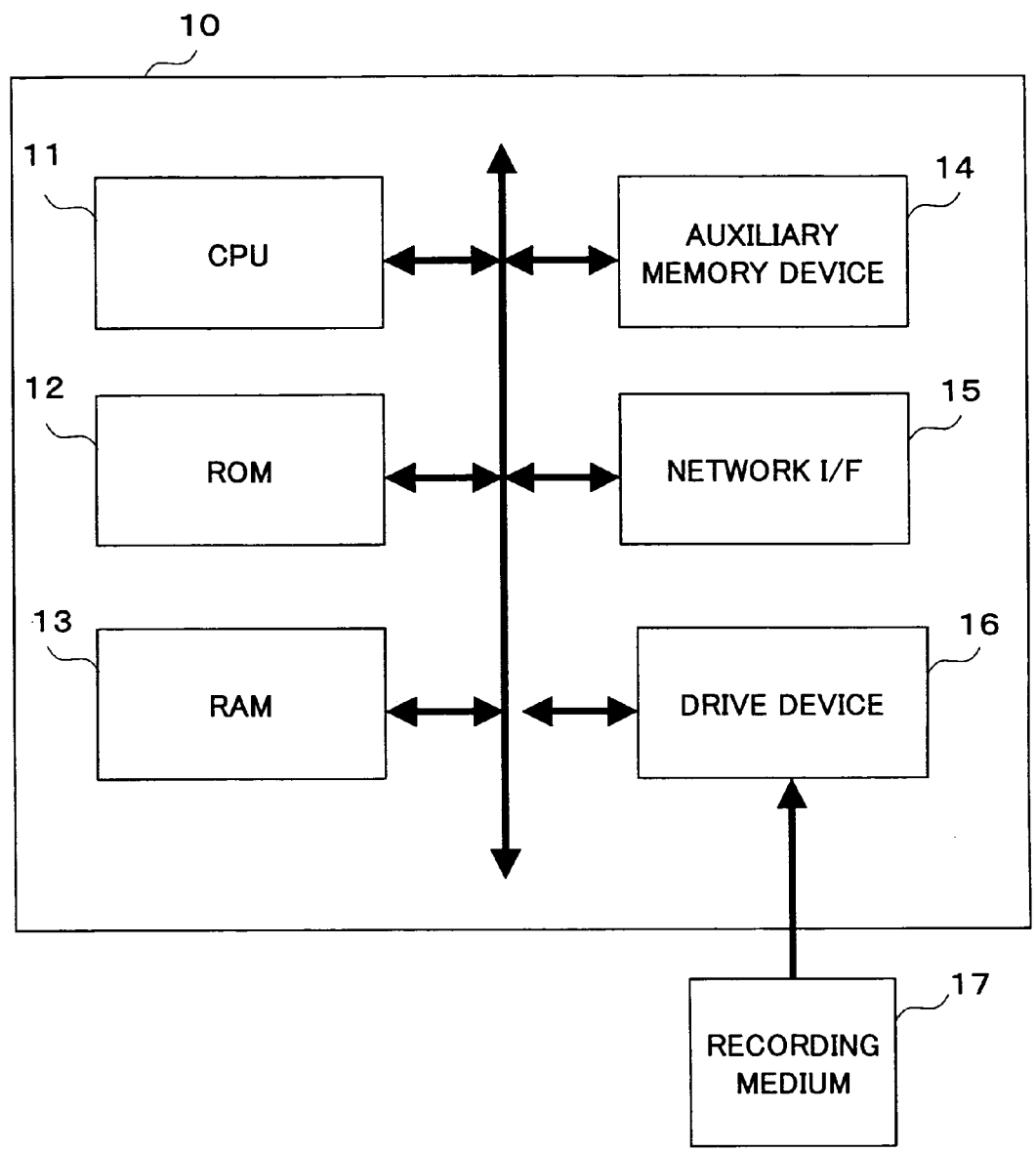
FIG. 3 is a block diagram of a hardware composition of the Web server in the present embodiment.

FIG. 3 shows a hardware composition of the Web server in the present embodiment of the invention.

As shown in FIG. 3, the Web server 10 comprises the CPU 11, the ROM 12, the RAM 13, the auxiliary memory device 14, the network interface (I/F) 15, and the drive device 16.

The CPU 11 is a control unit which controls the entire Web server 10. The CPU 11 performs various control programs and application programs stored in the ROM 12 or the auxiliary memory device 14, and carries out the control of the device, the communicative control, and the acquisition and editing of data.

The ROM 12 is a storage device which mainly stores the control programs of the device, and the RAM 13 is a storage unit which is used as the work memory of the CPU 11 and the temporary data storage.

The auxiliary memory device 14 is a storage device which stores the various application programs and data, and stores the files if needed. The network I/F 15 is the interface for connecting the Web server 10 to the network 70. The drive device 16 is the device for reading the recording medium 17, such as a CD-ROM on which the program which executes the function of the invention is recorded.

In the present embodiment, neither the operation unit nor the display device is shown in the composition of FIG. 3. Alternatively, the Web server 10 may be provided with the operation unit, such as the keyboard, the mouse, etc. and the display device, such as the LCD (liquid crystal display), and the CRT (cathode ray tube) display, etc. In such alternative embodiment, the receiving of the input from the user and the displaying of the operational results can be realized.

Next, a description will be given of a software composition of the Web server 10.

Figure 4:
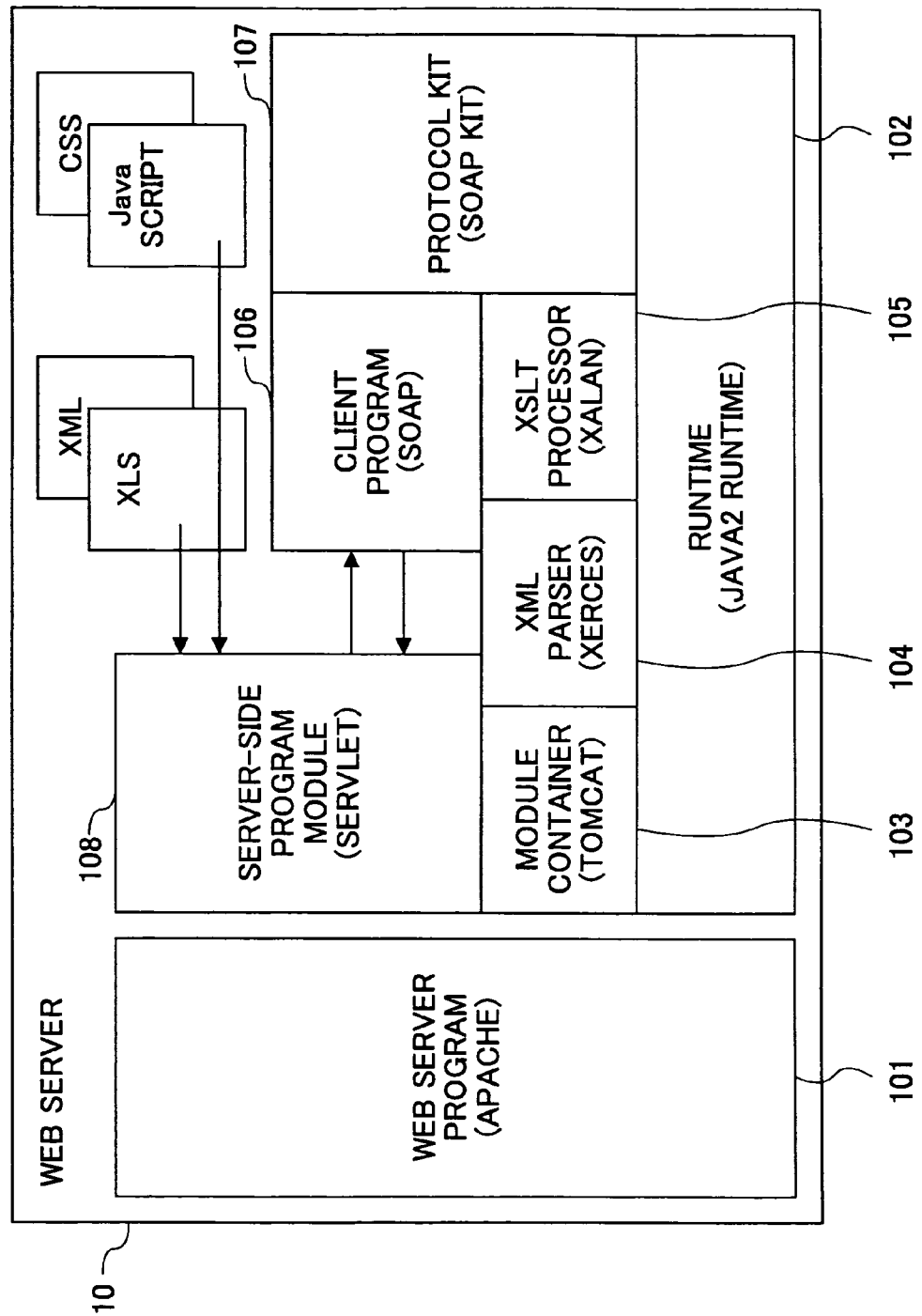
FIG. 4 is a block diagram of a software composition of the Web server in the present embodiment.

FIG. 4 shows a software composition of the Web server in the preferred embodiment of the invention.

As shown in FIG. 4, the Web server 10 is provided with the software including the Web server program 101, the runtime 102, the module container 103, the XML parser 104, the XSLT processor 105, the client program 106, the protocol kit 107, and the server side program module 108.

And the above-described software is stored in the auxiliary memory device 14 or the ROM 12, and when the CPU 11 is requested, it is read and performed. Alternatively, it is possible to make it acquire such software from the exterior through the network I/F 15.

Among these, the Web server program 101 is the software for transmitting the Web page according to the request from the client 20 in the Web system 1. For example, the Apache currently provided by the Apache Software Foundation may be used as the Web server program 101.

The runtime 102 is the software module needed when the application program is executed, and the Java2 (registered trademark) runtime is used for performing the application program created by the programming language called the Java2 provided by the Sun Microsystems Co.

The module container 103 is the software which provides the execution environment for performing the server side program module 108. For example, the Tomcat currently provided by the Apache Software Foundation can be used as the module container 103.

The XML (extensible markup language) parser 104 is the software provided to develop the XML data described in text into the memory in a tree structure, and it is made easy to deal with other application programs. For example, the Xerces currently provided by the Apache Software Foundation can be used as the XML parser 104.

The XSLT (extensible stylesheet language transformation) processor 105 is the software for transforming the XML data according to the XSL data. For example, the Xalan currently provided by the Apache Software Foundation can be used as the XSLT processor 105.

The client program 106 is the software for requesting the processing to the SOAP server, such as the document managing server 30. For example, the software which performs the communication procedure by the SOAP can be used as the client program 106. Moreover, the protocol kit 107 is the software for actually performing the communications according to the request.

The server-side program module 108 is the program which is performed on the Web server and arranged in the module formation. In the present embodiment, the Servlet created using the Java2 language is used as the server-side program module 108.

Most of the processings in the present embodiment of the Web server 10 are realized by causing the CPU 11 to function as the various units in accordance with the server-side program module 108. That is, the server side program module 108 serves as the program for carrying out the calling of the functions of the document managing server 30 and the Web page creation according to the request from the client 20.

In addition, when transforming the XML data according to the XSL data to create the HTML data as in the Web server 10, the codes by the Java Script for specifying the error operation in the pop-up, and the Cascading StyleSheet (CSS) data for specifying the displaying method not covered by the specifications of HTML and XSL, may be used collectively. The required CSS data and Java Script codes may be included directly in the XSL data, or the reference information of such data and codes may be included in the XSL data. Hence, the required CSS data and Java Script codes maybe included in the XSL data which are the transformed data.

The functions to create the Web page which is provided to the client 20 are incorporated in the Web server 10 of the present embodiment based on the hardware and software composition described above.

Next, a description will be given of an example of the function of the Web page creation in the Web server 10.

Figure 5:
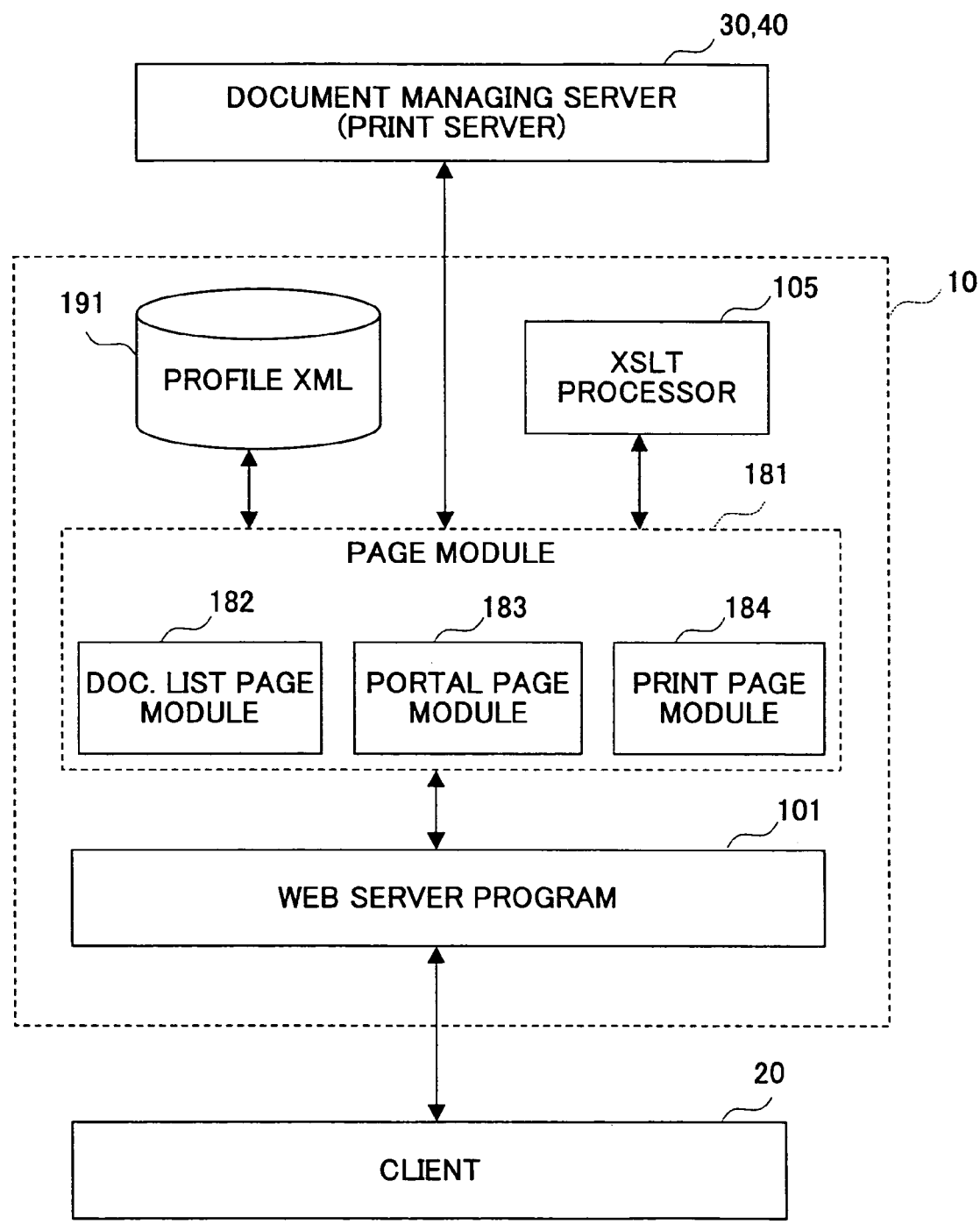
FIG. 5 is a block diagram of a functional composition of the Web server to create a Web page and deliver the Web page.

FIG. 5 is an example of the Web page creation function of the Web server in the present embodiment. The Web page creation function of FIG. 5 is realized by the server side program module 108 of FIG. 3 in the present embodiment.

As shown in FIG. 5, the Web page creation function of the Web server 10 mainly includes the Web server program 101, the page module 181, the XSLT processor 105 and the profile XML 191.

The page module 181 is the module which controls the processing to create a Web page. In the example of FIG. 5, the page module 181 is provided to include two or more instances of the page module 181 each of which controls the processing to create each Web page.

Specifically, in the present embodiment, the document list page module 182, the portal page module 183, and the print page module 184 are provided as the instances of the page module 181.

The document list page module 182 is an instance of the page module 181 which acquires the document information (the document data list, the folder path, etc.), managed by the document DB 31, from the document managing server 30, and creates a Web page (in this case, "document list page") with which the acquired document information is displayed on the client 20.

The portal page module 183 is an instance of the page module 181 which creates the portal page that is used to show the portal site in the Web server 10. With the display of the portal page, the personalized information prepared per user is displayed in each of a plurality of division regions of the portal page. The above-mentioned document list page can also be displayed by using the link included in the display of the portal page.

The print page module 184 is an instance of the page module 181 which performs the creation processing of the Web page (in this case, "print page") for requesting the printing of document data, and performs the printing processing requested in the print page.

The profile XML 191 is the file of XML format which describes the predetermined information which is retrieved by each page module 181 when creating the Web page. The predetermined information in the file of XML format is managed per user.

In addition, it is not necessary to install the profile XML 191 in the Web server 10. As being described later, the profile XML 191 may be arranged at any node of the network 70 if it can be accessed by the Web server 10 (retrieval, updating, etc.) through the network 70.

The Web server 101 and the XSLT processor 105 have already been described with reference to FIG. 4, and a description thereof will be omitted.

Next, a description will be given of the processing of the Web server 10 of FIG. 5. First, the processing of the Web server 10 to deliver the document list page to the client 20 in the present embodiment will be explained.

Figure 6:
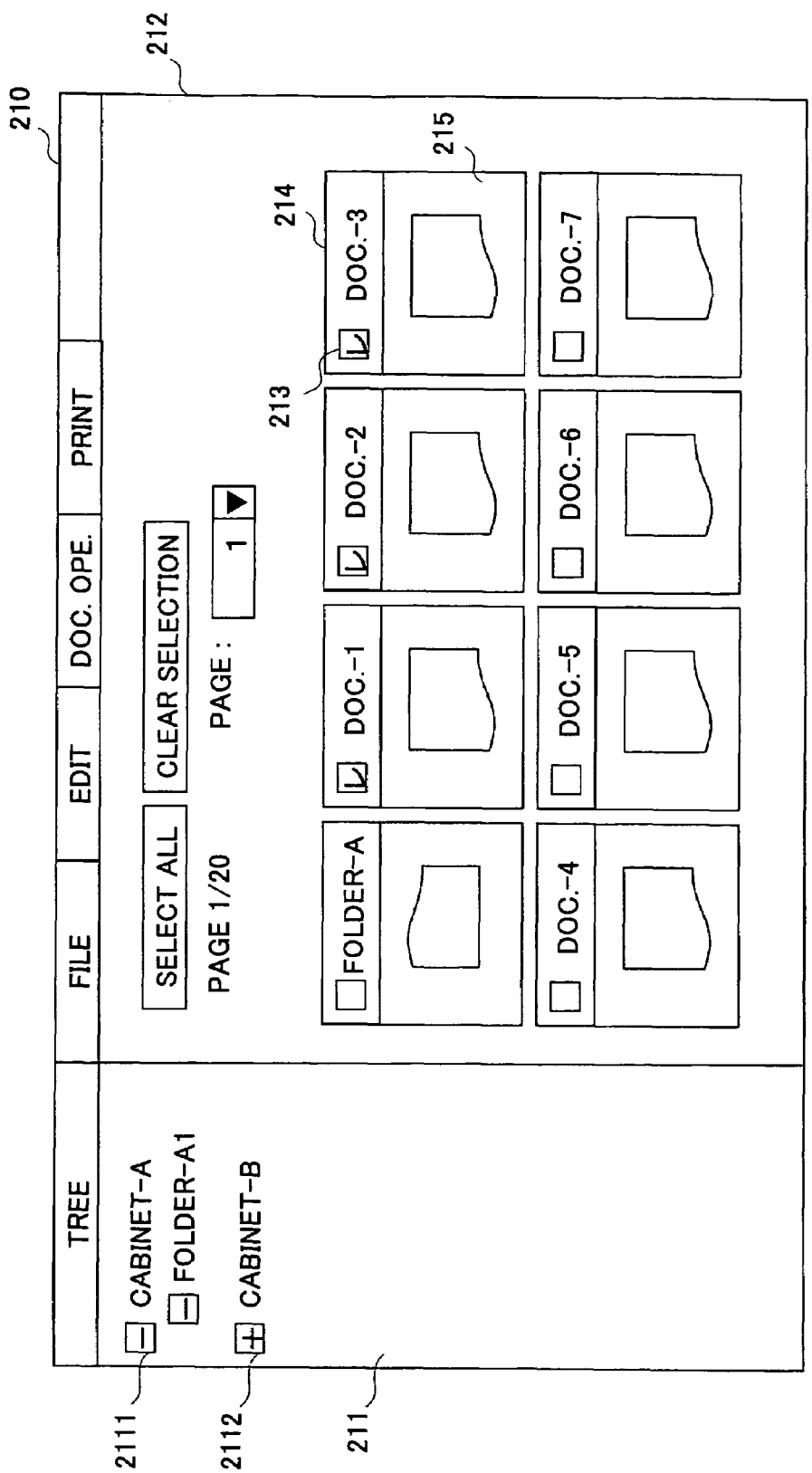
FIG. 6 is a diagram showing an example of the display of a document list page.

The document list page is a Web page which is displayed as shown in FIG. 6. FIG. 6 shows an example of the display of the document list page.

As shown in FIG. 6, the document list page 210 includes the folder viewing area 211 and the document list viewing area 212.

In the folder viewing area 211, the cabinets in the document DB 31 are arranged in the horizontal direction of the page. The folders under each cabinet, and further the folders under each folder, etc., which are arranged in a hierarchical tree structure similar to a general tree structure, are displayed in the folder viewing area 211.

In the document list viewing area 212, the thumbnail indication of the list of the document data recorded within the folder which is selected in the folder viewing area 211 is given. In this example, the rectangular portion in which one document data is displayed is called "cell". Each cell includes the check button for choosing the document data, the document name viewing area for displaying the name (document name) of the document data, and the icon viewing area.

For example, as for the cell in which the document data the document name of which is "document-3" is displayed, the cell includes the check button 213, the document name viewing area 214, and the icon viewing area 215.

As previously described with reference to FIG. 2, the four cabinets (cabinet-A through cabinet-D) are included in the document DB 31. However, only the two cabinets (cabinet-A and cabinet-B) are displayed in the folder viewing area 211 of FIG. 6. This is because the definition that the displaying of cabinet-A and cabinet-B is made active is given in the profile XML 191. Also, the cabinets as the displayed objects of the folder viewing area 211 are defined according to the definition of the profile XML 191.

FIG. 7 shows an example of the definition of the profile XML in the Web server in the present embodiment.

The information concerning the cabinets displayed in the folder viewing area 211 of the document list page 210 as a root node of the hierarchical tree structure is defined in the profile XML 191.

In the example of FIG. 7, the description 1911 surrounded with the RootNode tag includes the information concerning cabinet-A, and the description 1912 surrounded with the RootNode tag includes the information concerning cabinet-B.

In each description, the value of the ServiceURI attribute of the RootNode tag indicates the URI of the cabinet concerned. That is, it is indicated that the URI of cabinet-A is "http://xxx/cabinetA", and the URI of cabinet-B is "http://xxx/cabinetB". The value of the ServiceURI attribute is used as the information for identifying the cabinet (resource) which is made applicable to the retrieval when the root node of the tree structure is clicked on the document list page 210.

In addition, in each description, the value (description 1911a, description 1912a) of the RootNode element indicates a set of characters which is displayed in the folder viewing area 211 at the node corresponding to the cabinet concerned as being the name of the cabinet concerned. Therefore, the definition of the profile XML 191 in this example indicates that the characters "Cabinet-A" and "Cabinet-B" are displayed in the folder viewing area 211 at the node corresponding to each cabinet as being the name of each cabinet.

According to the definition of the profile XML 191 of FIG. 7, it is determined that the cabinets displayed in the folder viewing area 211 as the root node cabinets are the cabinet-A and the cabinet-B only. Therefore, as shown in FIG. 6, only cabinet-A and cabinet-B are displayed in the folder viewing area 211 of the document list page 210 which is created according to the profile XML 191.

Thus, the document information recorded in the folders under cabinet-C and cabinet-D cannot be accessed by performing the clicking operations on the tree structure display in the folder viewing area 211, in the state where only cabinet-A and cabinet-B are displayed in the folder viewing area 211.

A description will be given of a case in which only cabinet A and cabinet-B are set as the displayed objects of the folder viewing area 211, and the user on the client 20 needs to perform the processing to retrieve the document information in a certain folder under cabinet-C.

In this example, it is assumed that an e-mail which requests the confirmation of new document data is received from another user who has recorded new document data in the location of a given folder under cabinet-C. The path of the given folder is for example, "cabinet-C/folder-C2/folder-C21".

In the e-mail, the URL of the folder in which the new document data is recorded is described as follows.

$$\text{http://<the path to document list page 210>?<folder ID>} \quad (1)$$

In the URL (1) above, the folder ID specified in the arguments is the folder identifier that is uniquely assigned to each folder. In this example, a unique folder ID of the folder "cabinet-C/folder-C2/folder-C21" is specified as the argument information.

The URL (1) above is displayed in the URL input area of the web browser when the other user opens the folder concerned in the document list page 210, and this URL (1) is transferred without change.

Figure 8:
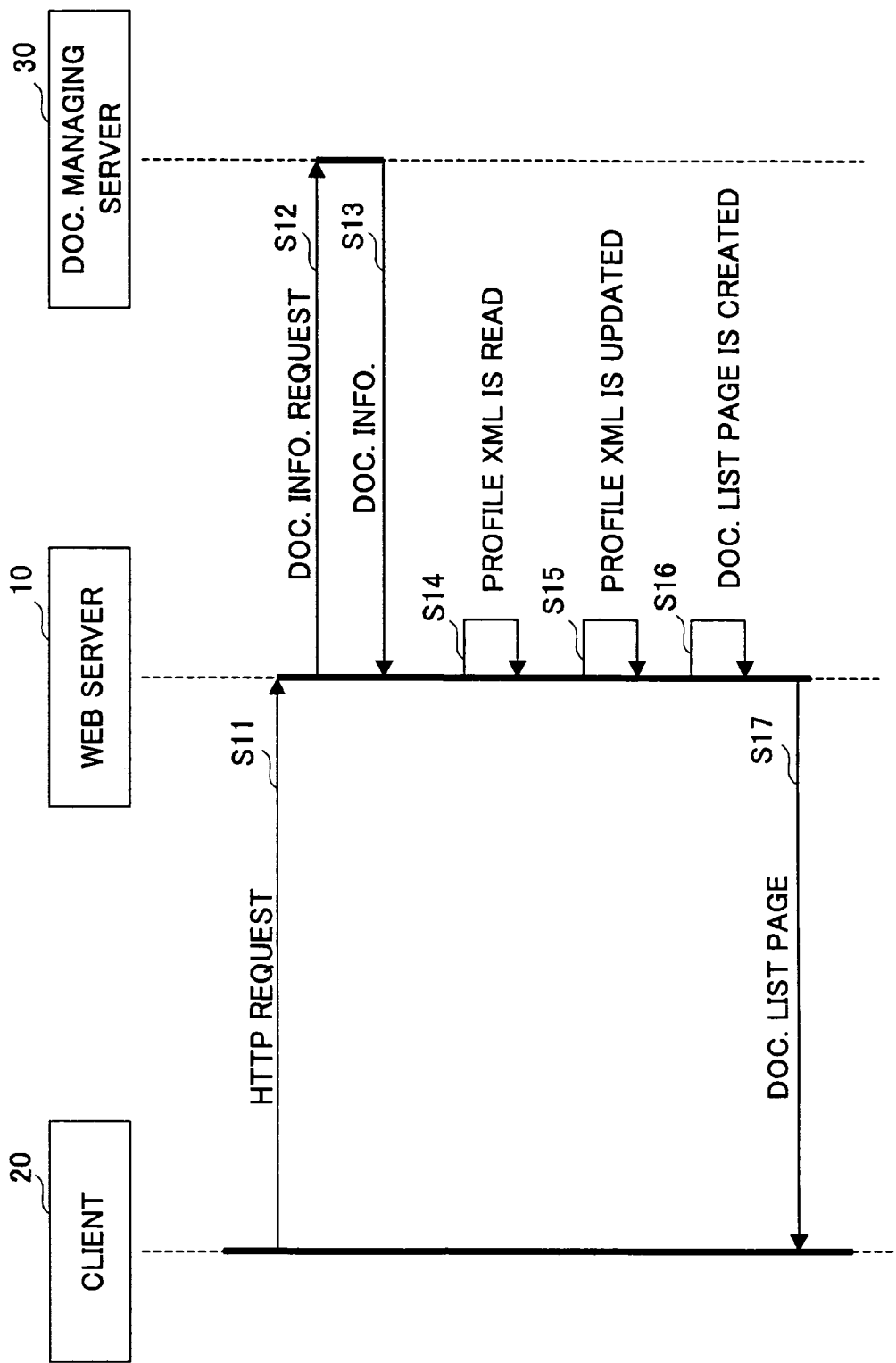
FIG. 8 is a sequence diagram for explaining the processing of the Web server in a first preferred embodiment of the Web page creation apparatus of the invention.

FIG. 8 is a sequence diagram for explaining the processing of the Web server in the first preferred embodiment of the invention.

At step S11, if the user of the client 20 who has received the e-mail from the other user double-clicks the URL (1) indicated in the e-mail, the client 20 transmits the request of acquisition (HTTP request) of the information 210 determined by the URL (1) (i.e., the document list page) to the Web server 10.

Progressing to step S12 following step S11, the Web server program 101 of the Web server 10 interprets the HTTP request, and calls the document list page module 182. The document list page module 182 requests, to the document managing server 30, the transmission of both the information of the document list data under the folder (folder-C21) determined by the folder ID specified in the arguments of the HTTP request, and the path information of the folder concerned (the list of parent folders of folder-C21) from the document managing server 30 to the document list page module 182.

In addition, this request is performed by the document list page module 182 through the calling of the document-retrieval method mounted in the document managing server 30 using the RPC of the SOAP.

Progressing to step S13 following step S12, the document managing server 30 retrieves the document list information under the "folder-C21" and the path information of the "folder-C21" in the document DB 31, and transmits the document list information and the path information to the Web server 10.

In the present example, the path information is described in a form that the parent folders of "folder-C21" are sequentially listed, such as "folder-C2, cabinet-C".

Progressing to step S14 following step S13, the document list page module 182 reads the profile XML 191 corresponding to the user, and determines whether the displaying of the cabinet (cabinet-C) to which the folder (folder-C21) concerned belongs is made active in the profile XML 191. The cabinet to which the folder concerned belongs is determined based on the path information received in the step S13.

Progressing step S15 following step S14, when the information corresponding to the cabinet (cabinet-C) concerned (that is, the displaying of which is made active in the profile XML 191) is not registered in the profile XML 191, the information corresponding to the cabinet concerned is newly registered into the profile XML 191.

FIG. 9 showing an example of the definition of the profile XML to which the information corresponding to cabinet-C is added. In the example of FIG. 9, the description 1913 contains the information related to the newly added cabinet-C.

Progressing to step S16 following step S15, the document list page module 182 creates the document list page 210.

In the present example, the document list page module 182 arranges cabinet-A and cabinet-B as the root nodes in the folder viewing area 211 of the document list page 210 according to the definition of the profile XML 191.

Moreover, the document list page module 182 adds cabinet-C as a new root node, and arranges each node to "the folder-C21" in the folder viewing area 211 so that the path to "the folder-C21" made applicable to the display may be known.

Moreover, the document list page module 182 stretches the link for each node performing retrieval processing to the cabinet or folder corresponding to each node made applicable to the display in the folder viewing area 211.

In the present embodiment, the URL registered into the profile XML 191 is specified as a link place to the node corresponding to the cabinet.

Furthermore, the document list page module 182 creates the document list page 210 so that the document list information acquired from the document managing server 30 may be displayed on the document list viewing area 212.

Progressing to step S17 following step S16, the Web server program 101 transmits the document list page 210 created by the document list page module 182, to the client 20, and the document list page 210 is displayed by the web browser of the client 20.

Figure 10:
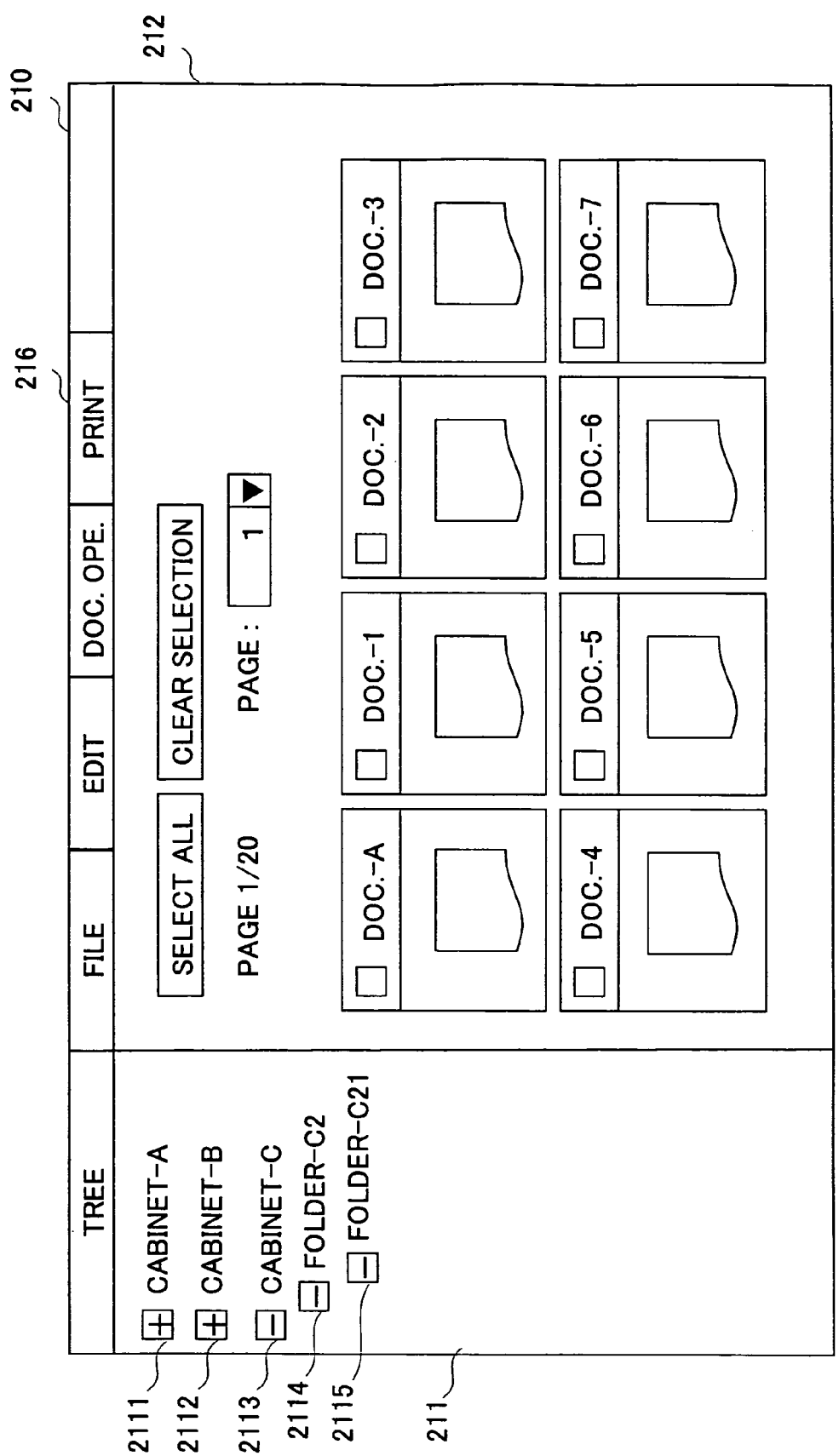
FIG. 10 is a diagram showing an example of the display of the folder-C21 in the document list page.

FIG. 10 shows an example of the display of the document list page in which the displaying of the folder-C21 is newly activated.

As shown in FIG. 10, the root node 2113 corresponding to cabinet-C is newly added to the folder viewing area 211, and each node (the node 2114 and the node 2115) corresponding to the "folder-C21" the displaying of which is activated is also displayed in the folder viewing area 211.

Moreover, the document list information of the document data recorded in the "folder-C21" is displayed in the document list viewing area 212.

The definition of cabinet-C is added to the profile XML 191 by the above processing. When the user on the client 20 intends to display the document list page 210 according to the updated profile XML 191, the same processing as the above steps S11-S17 of FIG. 8 is performed again. In such a case, the root node corresponding to cabinet-C is displayed in the folder viewing area 211 as a user interface for performing the retrieval to cabinet-C even when the displaying of the folders under cabinet-C is not activated.

As described above, according to the Web server 10 of the present embodiment, the root node of the cabinet in which the folders under that cabinet are retrieved once is automatically displayed in the Web page, and the user can perform the retrieval operation to the cabinet concerned easily.

Moreover, when the displaying of the folders under the cabinet the displaying of which is not activated in the profile XML 191 is activated newly, the Web server 10 in the present embodiment adds the root node corresponding to the cabinet concerned to the profile XML 119, adds each node to the folders which serve as the candidate for the displaying further to the profile XML 119, and displays the document list page 210 in the folder viewing area 211.

Therefore, the document list page 210 is displayed while the compatibility in the display between the folder viewing area 211 and the document list page viewing area 212 is taken, and therefore the operability of the document list page 210 can be raised.

Next, a description will be given of the second preferred embodiment of the invention in which the printing of document data is instructed from the client 20.

First, the prerequisites for the processing of the Web server in the second preferred embodiment will now be explained.

Figure 11:
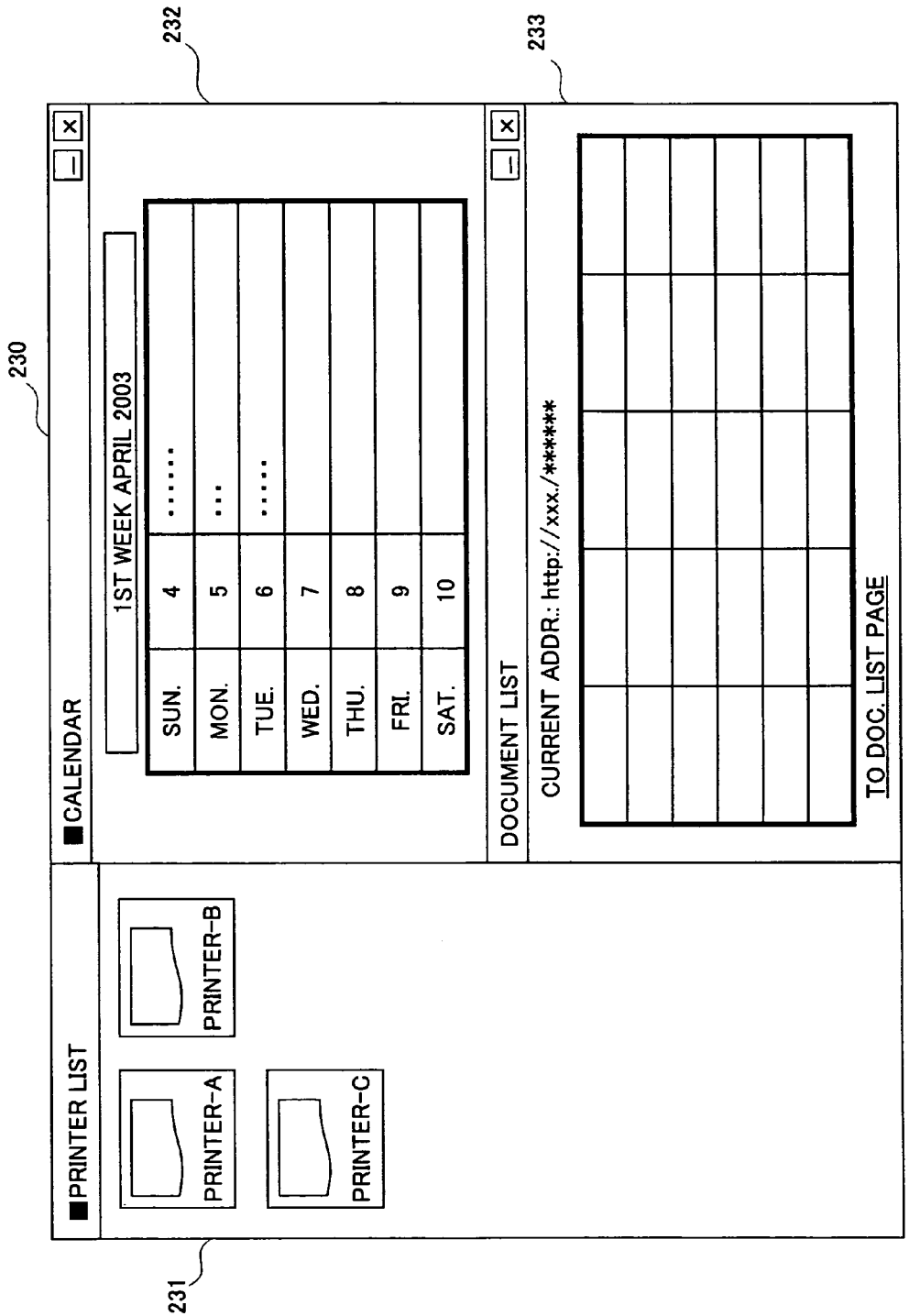
FIG. 11 is a diagram showing an example of the display of the portal page.

FIG. 11 shows an example of the display of the portal page. As shown in FIG. 11, the portal page 230 is the Web page which is used to show the portal site in the Web server 10, and two or more information items are displayed on one page so that the user can view the two or more information items together at a time.

Specifically, in the portal page 230 of FIG. 11, the icons (printer-A 41, printer-B 42, printer-C 43) corresponding to the printers frequently used by the user are displayed in the printer list viewing area 231. Moreover, the calendar information is displayed in the calendar viewing area 232. Furthermore, the document list data is displayed in the document list viewing area 233.

Next, a description will be given of the printer list viewing area 231.

If the user clicks the arbitrary icon currently displayed in the printer list viewing area 231, the HTTP request will be transmitted to the printer corresponding to the icon, and the Web page ("printer state page") with which the status information of the printer concerned is displayed will be transmitted.

That is, each icon in the printer list viewing area 231 of the portal page 230 corresponds to a user interface for performing the processing for displaying the status information of the corresponding printer on the client 20.

Figure 12:
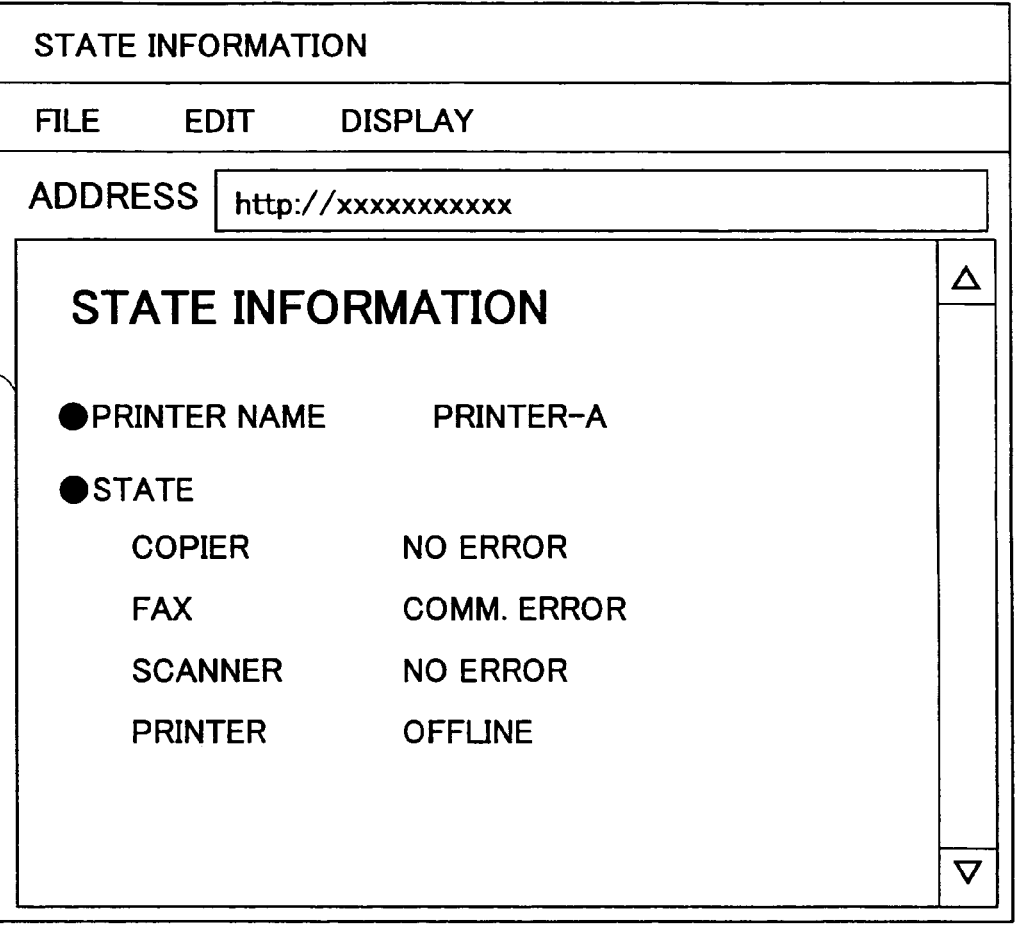
FIG. 12 is a diagram showing an example of the display of the printer state page.

FIG. 12 shows an example of the display of the printer state page. As shown in FIG. 12, the various information items about the printer concerned are displayed in the printer state page 240. The printer which serves as the candidate for the display in the printer list viewing area 231 is recorded in the profile XML 191.

FIG. 13 shows an example of the definition of the profile XML in the second preferred embodiment of the invention. As shown in FIG. 13, the description 1915, the description 1916, and the description 1917, surrounded with the Printer tag, are the information items corresponding to the printer-A 41, the printer-B 42, and the printer-C 43, respectively.

In each description, the value of the IPAddress attribute of the Printer tag indicates the IP address of the printer concerned. In addition, the value of the IPAddress attribute is used as the information item for identifying the printer (resource) which is made to the object of the processing needed when the icon of the printer concerned is clicked on the printer state page 240.

According to the profile XML 191 of FIG. 13, it is determined that the printers the icons of which are displayed in the printer list viewing area 231 are the printer-A 41, the printer-B 42, and the printer-C 43.

With the assumption of the above-mentioned prerequisites, a description will now be given of the second preferred embodiment of the invention.

In the document list viewing area 212 of the document list page 210 of FIG. 10, if the user clicks the check button corresponding to document data the printing of which is desired to perform and then clicks the printing button 216, the print page for setting up the printing conditions is displayed on the web browser.

Figure 14:
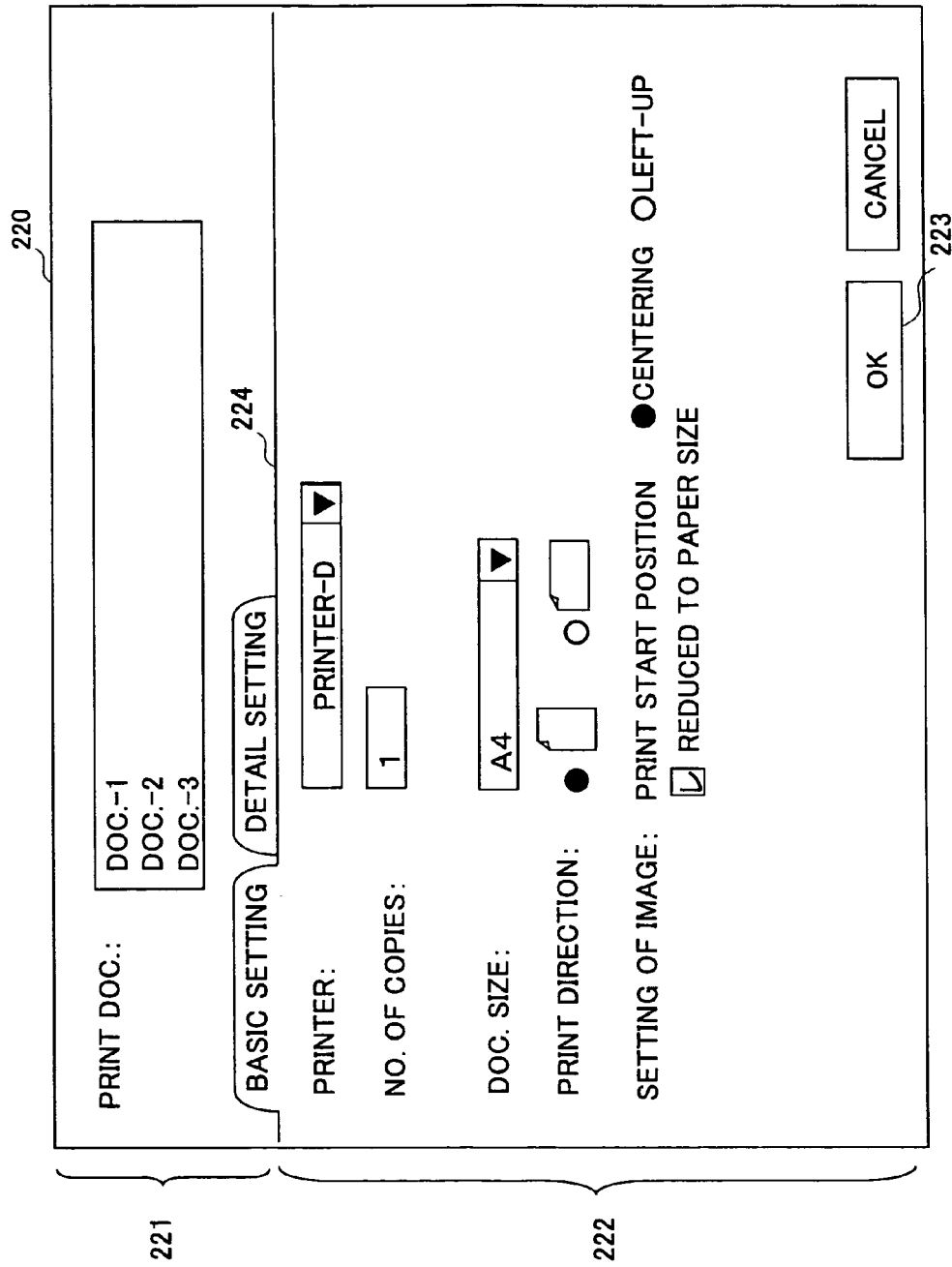
FIG. 14 is a diagram showing an example of the display of the print page.

FIG. 14 shows an example of the display of the print page. As shown in FIG. 14, the print page 220 is divided into two major portions: the printed document list viewing area 221 and the printing condition setting area 222.

The list of the document names of the document data chosen as the candidates for printing in the document list page 210 is displayed in the printed document list viewing area 221.

The printing condition setting area 222 is the region for setting up the printing conditions. With the printing condition setting area 222, the setting of the printing conditions including the printer name of the printing place, the number of copies being printed, the document size, the printing direction and the image printing can be performed.

In addition, with the setting of the image printing, the option of the print-start position and the option of reduction of the image to the paper size can be set up.

In the example of FIG. 14, the setting of the printing conditions is performed so that the printer name of the printing place is "Printer-D", the number of copies being printed is "1", the document size is "A4", the printing direction is "Vertical", the option of the print-start position is "centering", and the option of reduction of the image to the paper size is "On".

The O.K. button 223 of the print page 220 is the button which is clicked by the user when the printing is performed. If the user clicks the O.K. button 223, then the processing of FIG. 15 is started.

FIG. 15 is a sequence diagram for explaining the processing of the Web server in the present embodiment.

As shown in FIG. 15, in accordance with the click of the O.K. button 223 in the print page 220, the client 20 at step S21 transmits the HTTP request, which requests the printing of the document data to the printer-D 44, to the Web server 10.

Progressing to step S22 following step S21, the Web server program 101 of the Web server 10 interprets the HTTP request and calls the print page module 184. The print page module 184 requests the printing of the document data to the printer-D 44 of the print server 40 by calling the printing method of the print server 40 using the RPC of the SOAP.

Progressing to step S23 following step S22, the print server 40 causes the printer-D 44 to print the document data, and transmits the processing result information, indicating whether the printing processing of the printer of the printing place (printer-D 44) is successfully completed or not, to the Web server 10.

Progressing to step S24 following step S23, the print page module 184 determines whether the information item corresponding to the printer of the printing place (printer-D 44), included in the processing result information received from the print server 40, is recorded in the profile XML 191 corresponding to the user concerned (the retrieval of the profile XML 191). When the information item is not recorded in the profile XML 191, the print page module 184 at step S24 records the information item corresponding to the printer-D 44 in the profile XML 191 (the updating of the profile XML 191).

FIG. 16 shows an example of the definition of the profile XML after the updating in the present embodiment. In the example of FIG. 16, the description 1918 contains the information item corresponding to the newly added printer-D 44.

Progressing to step S25 following step S24, the print page module 184 creates the Web page for notifying the completion of printing. For example, a message indicating that the printing of the document data is successfully completed is displayed with the Web page. Hereafter, the Web page including this message is called "print-end notice page".

Progressing to step S26 following step S25, the Web server program 101 transmits the print-end notice page to the client 20, so that the print-end notice page indicating the completion of the printing will be displayed on the web browser of the client 20.

The user recognizes that the printing of the document data is completed, by making reference to the print-end notice page displayed on the web browser of the client 20.

Next, a description will be given of the case in which the user intends to access the portal page 230.

FIG. 17 is a sequence diagram for explaining the processing of the Web server to create the portal page in the present embodiment.

If the user inputs the URL of the portal page 230 into the web browser of the client 20 as the portal page 230 to be accessed, the client 20 transmits the HTTP request of acquisition of the portal page, to the Web server 10 (S31).

Progressing to step S32 following step S31, the portal page module 183 acquires the information on the printer made applicable to the display in the printer list viewing area 231 of the portal page 230 from the profile XML 191 corresponding to the user.

The profile XML 191 used as the informational acquisition place is defined as shown in FIG. 16. Hence, the printer-A 41, the printer-B 42, the printer-C 43, and the printer-D 44 become the candidates for the display.

Progressing to step S33 following step S32, the portal page module 183 creates the portal page 230. Specifically, the portal page module 183 creates the portal page 230 so that the icons corresponding to the four printers (the printer-A 41 through the printer-D 44) may be displayed on the printer list viewing area 231.

In such circumstances, when each icon is clicked, the portal page module 183 stretches the link to the IP address (what is recorded in the profile XML 191) corresponding to that icon so that the status information of the printer corresponding to the icon may be displayed.

In addition, the processing to acquire the information which is displayed in the calendar viewing area 232, etc. is required in order to complete the portal page 230, but a description thereof will be omitted, for the sake of convenience.

Progressing to step S34 following step S33, the Web server program 101 transmits the portal page 230 to the client 20, so that the portal page 230 will be displayed on the web browser of the client 20.

Figure 18:
FIG. 18 is a diagram showing an example of the display of the portal page to which the icon of the printer-D is added.

FIG. 18 shows an example of the display of the portal page to which the icon of printer-D is added.

In the portal page 230 of FIG. 18, the icon 2311 corresponding to the printer-D 44 is added as a user interface for performing the processing to newly display the status information of the printer-D 44 on the client 20, when compared with the portal page before the printing is performed using the printer-D 44 (FIG. 11).

By this composition, the user can easily check the status information of the printer-D 44 on the portal page 230.

In addition, in the above-described embodiments, the Web server 10 is provided to include the profile XML 191. However, it is not necessary to arrange the profile XML 191 in the Web server 10.

Figure 19:
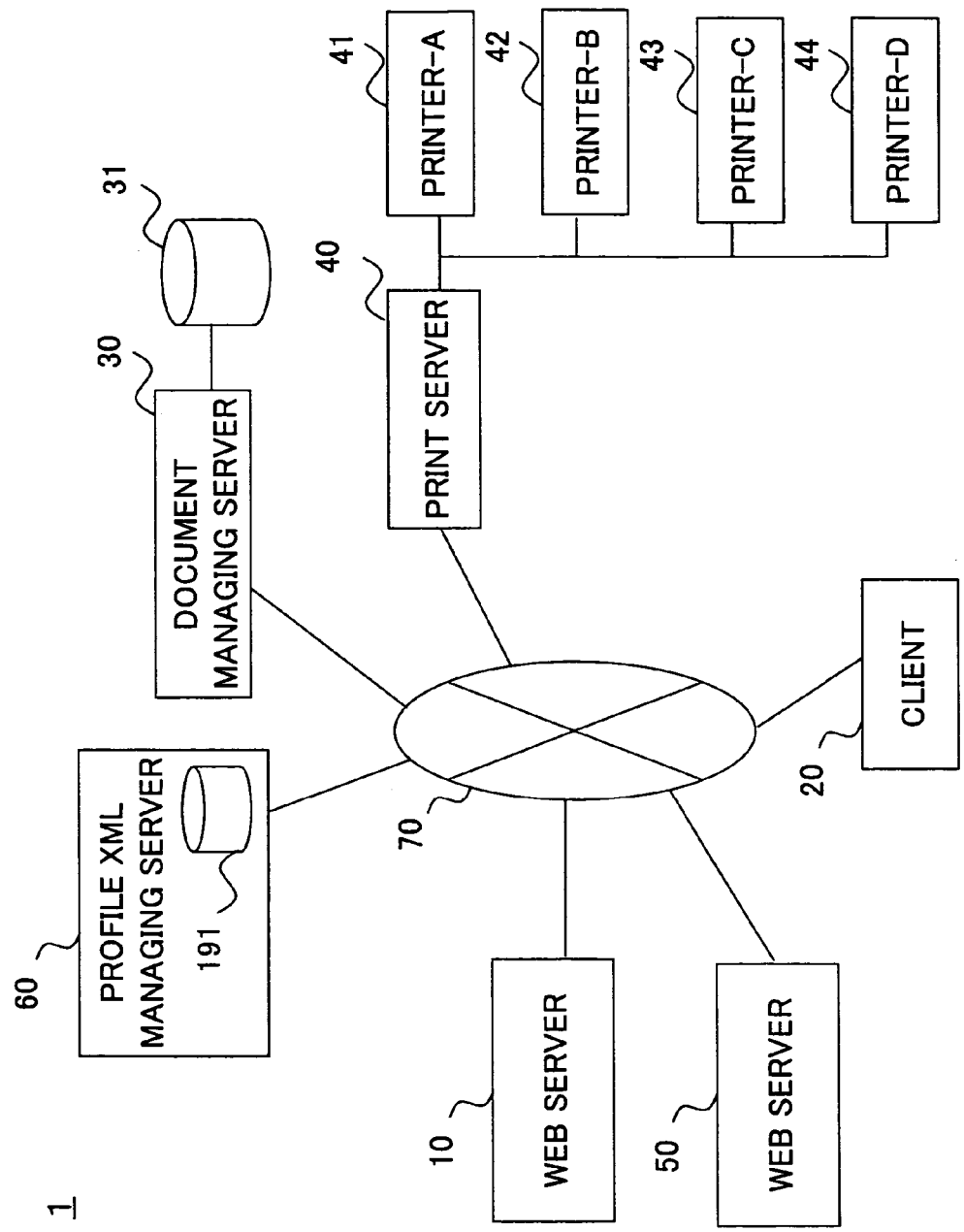
FIG. 19 is a block diagram of a Web system in which the profile XML is arranged in an external server.

For example, the Web system 1 may be constituted as shown in FIG. 19. FIG. 19 shows an example of the Web system in which the profile XML is arranged in an external server that is separate from the Web server 10.

In FIG. 19, the elements that are essentially the same as corresponding elements in FIG. 1 are designated by the same reference numerals, and a description thereof will be omitted.

As shown in FIG. 19, the profile XML managing server 70 and the Web server 50 are additionally provided in the composition of the Web system in FIG. 1.

The profile XML managing server 70 has the profile XML 191, and performs transmission of the information, recorded in the profile XML 181, to the Web server 10, or updating of the profile XML 191, in response to the request received from Web server 10 or the Web server 50 via the network 70.

The Web server 50 is a Web server that has the functions equivalent to those of the Web server 10 described above.

In the present embodiment, the profile XML 191 is arranged in the profile XML managing server 60, and the profile XML 191 can be shared by the Web server 10 and the Web server 50.

Therefore, the client 20 can display the document list page 210 and the portal page 230 in the same display mode either when the Web server 10 is used or when the Web server 50 is used.

Figure 20:
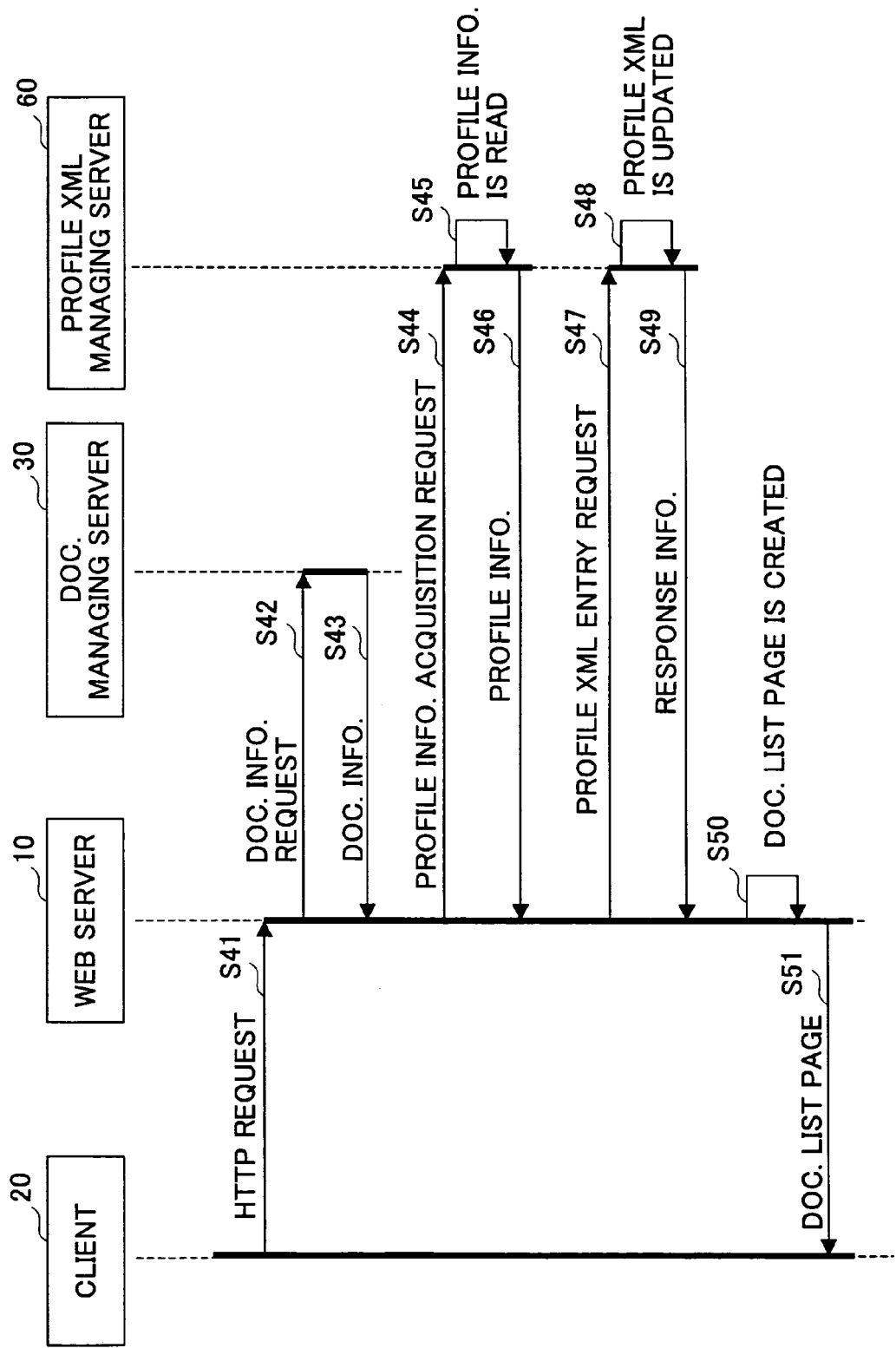
FIG. 20 is a sequence diagram for explaining the processing of the Web server to create the Web page when the external server manages the profile XML.

FIG. 20 is a sequence diagram for explaining the processing of the external server to manage the profile XML.

The processing of FIG. 20 corresponds to the processing (the creation of the document list page 210) of FIG. 8. Therefore, the processing of FIG. 20 is essentially the same as the processing of FIG. 8, and exceptionally the processing of step S14 and step S15 in FIG. 8 is modified to the processing of steps S44-S46 and steps S47-49 in FIG. 20 respectively.

In each case, the retrieval or updating of the profile XML 191, which is locally performed in the processing of FIG. 8, is performed remotely by means of the profile XML managing server 60.

In recent years, various devices which are specialized in a certain specific function are provided with the Web server function and the network communicating function, and such devices are capable of performing information processing equivalent to a personal computer.

For example, an image forming apparatus having a plurality of application programs which perform the processing specific to the multiple services, including the printer, the copier and the facsimile functions, is provided, which is called the multi-function peripheral system.

Some of the recent image forming apparatuses are provided with the Web server function and the document-management function. By using the document-management function, the copied information or the information of the received facsimile data can be accumulated and managed as the document data.

Figure 21:
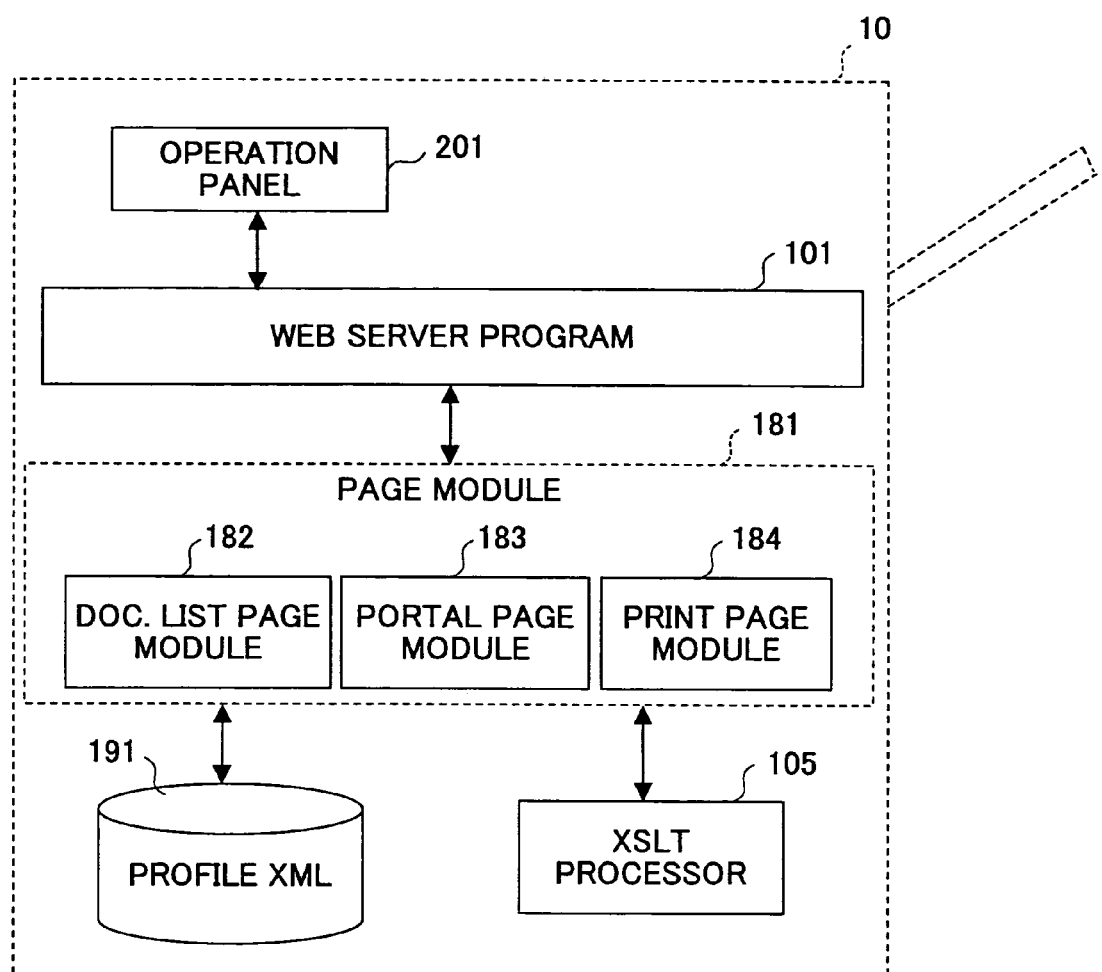
FIG. 21 is a block diagram a functional composition of an image forming apparatus provided with the Web page creation function of the invention.

Therefore, it is possible to incorporate the Web page creation function, which is incorporated in the Web server 10 in the above-described embodiments, into such image forming apparatus (or the multi-function peripheral system). FIG. 21 shows an image forming apparatus which is provided with the Web page creation function of the present invention.

In FIG. 21, the elements which are essentially the same as corresponding elements in FIG. 5 are designated by the same reference numerals, and a description thereof will be omitted.

In the image forming apparatus 200 of FIG. 21, the operation panel 201 is the panel which provides the user interface for allowing the user to operate the image forming apparatus 200.

The operation panel 201 has the web browser function. The operation panel can send a request of acquisition of the Web page to the Web server program 101 based on the input by the user, and can display the Web page outputted by the Web server program 101 as the response to the request concerned.

Therefore, the software of the image forming apparatus 200 is configured to have the composition as shown in FIG. 21, and using the page module 181 and the XSLT processor 105, the image forming apparatus 200 can create the Web page in the same logic as the Web server 10. It is possible for the image forming apparatus 200 that the Web page is displayed on the operation panel 201 with which the processing related to the previously used function can be easily performed.

In addition, the information displayed on the Web page concerned may be provided to include not only the information concerning the printer function, the copier function, the fax function and the document-management function, mounted in the image forming apparatus 200, but also the information acquired through the network by the page module 181 as in the Web server 10.

The present invention is not limited to the above-described specific embodiments, and variations and modifications may be made without departing from the scope of the present invention.

Further, the present application is based on Japanese priority application No. 2003-108300, filed on Apr. 11, 2003, and Japanese priority application No. 2004-074963, filed on Mar. 16, 2004, the entire contents of which are hereby incorporated by reference.

What is claimed is:

1. A Web server for presenting a hierarchical organization of information in response to a request, comprising:
   a request-related information management unit configured to manage request-related information items of a user profile, and to process a request received from an external device operably linked to the Web server through a network, the request including a request-related information item, the request related information item being transmitted to a data repository by the request-related information management unit for obtaining an identification of a document path from the data repository in response;
   a request-related information activation unit configured to create and activate a new root document folder within the hierarchical organization of information, the root document folder corresponding to the document path of the request-related information item of the request, in the user profile, upon determination that the root document folder does not exist in the user profile; and
   a Web page creation unit configured to create a Web page based on the user profile, corresponding document path and activated root document folder, including a user interface displaying the request-related information item as a component of the document path, including the activated root document folder.

2. The Web server according to claim 1 further comprising:
   a Web page transmission unit transmitting the Web page created by the Web page creation unit, to the external device over the network.

3. The Web server according to claim 1 wherein the request-related information activation unit is provided to record the request-related information item in the request-related information management unit provided in a request-related information managing server connected with the Web server through the network, and the Web page creation unit is provided to create the Web page based on the request-related information item recorded in the request-related information management unit of the request-related information managing server.

4. The Web server according to claim 1 wherein the request-related information items are managed per user.

5. The Web server according to claim 1 wherein the user interface is provided to indicate a node of the network where the predetermined information is stored in a hierarchical tree structure.

6. The Web server according to claim 1 wherein the predetermined information is document information containing a document data.

7. The Web server according to claim 1 wherein the request-related information activation unit is provided to record, in response to a print request of document data received from the external device, a request-related information item of an image forming device printing the document data, in the request-related information management unit, and wherein the Web page creation unit is provided to create the Web page with which a user interface configured to perform print processing of the image forming device is displayed.

8. The Web server according to claim 7 wherein the request-related information activation unit transmits a print request of the document data to a print managing device which is connected with the Web server through the network, based on the print request of the document data from the external device, and records the request-related information item of the image forming device printing the document data, contained in information received from the print managing device in response to the print request of the document data, in the user profile.

9. The Web server according to claim 8 wherein the request-related information activation unit determines whether the request-related information item of the image forming device printing the document data, contained in the information received from the print managing device, is already recorded in the user profile, and, when it is determined that the request-related information item is not recorded in the user profile, the request-related information activation unit records the request-related information item of the image forming device printing the document data in the user profile.

10. A Web server system including a Web server configured to create a Web page displayed on an external device, and the external device which is connected with the Web server through a network, the Web server, comprising:
   a request-related information management unit configured to manage request-related information items of a user profile, and to process a request received from the external device, the request including a request-related information item, the request-related information item being transmitted to a data repository by the request-related information management unit for obtaining an identification of a document path from the data repository in response;
   a request-related information activation unit configured to create and activate a new root document folder within the hierarchical organization of information, the root document folder corresponding to the document path of the request-related information item of the request, in the user profile, upon determination that the root document folder does not exist in the user profile; and
   a Web page creation unit configured to create a Web page based on the user profile, corresponding document path and activated root document folder, including a user interface displaying the request-related information item as a component of the document path, including the activated root document folder,
   wherein, the external device is provided data via the network for displaying the Web page created by the Web server.

11. A method of controlling Web page creation of a Web server for presenting a hierarchical organization of information in response to a request, comprising:
   recording a request-related information item in a request-related information management unit in response to a processing request, the request-related information management unit configured to manage request-related information items of a user profile, and to process a request received from an external device, the external device being operably linked to the Web server through a network, the request including a request-related information item, the request-related information item being transmitted to a data repository by the request-related information management unit for obtaining an identification of a document path of the request-related information item of the request, from the data repository in response;
   causing the external device to perform processing related to a processing request through a communication device, and creating and activating a new root document folder within the hierarchical organization of information, the root document folder corresponding to the document path of the request-related information item of the request, in the user profile, upon determination that the root document folder does not exist in the user profile; and creating a Web page based on the user profile, corresponding document path and attached root document folder within the hierarchical organization of information, in response to a request of acquisition of the Web page from the external device, including a user interface corresponding to the request-related information item as a component of the document path, including the activated root folder.

12. The method according to claim 11 wherein the recording provided to record the request-related information item in the user profile provided in a request-related information managing server connected with the apparatus through the network, and the Web page creating is provided to create the Web page based on the request-related information item recorded in the request-related information management unit of the request-related information managing server.

13. The method according to claim 11 wherein the request-related information items are managed per user.

14. The method according to claim 11 wherein the user interface is provided to indicate a node of the network where the predetermined information is stored in a hierarchical tree structure.

15. The method according to claim 11 wherein the predetermined information is document information containing a document data.

16. The method according to claim 11 wherein the recording is provided to record, in response to a print request of document data received from the external device, a request-related information item of an image forming device printing the document data, in the user profile and wherein the creating is provided to create the Web page with which a user interface for performing print processing of the image forming device is displayed.

17. A computer readable medium, including computer program instructions that cause a computer to execute a Web page creation method, the method comprising:

recording a request-related information item in a request-related information management unit in response to a processing request, the request-related information management unit configured to manage request-related information items of a user profile, and to process a request received from an external device, the external device being operably linked to the Web server through a network, the request including a request-related information item, the request-related information item being transmitted to a data repository by the request-related information management unit for obtaining an identification of a document path of the request-related information item of the request, from the data repository in response;

causing the external device to perform processing related to a processing request through a communication device, and creating and activating a new root document folder within the hierarchical organization of information, the root document folder corresponding to the document path of the request-related information item of the request, in the user profile, upon determination that the root document folder does not exist in the user profile; and creating a Web page based on the user profile, corresponding document path and attached root document folder within the hierarchical organization of information, in response to a request of acquisition of the Web page from the external device, including a user interface corresponding to the request-related information item as a component of the document path, including the activated root folder.

18. An information processing device including a built-in communication device which communicates with an external device connected via a network, comprising:

a request-related information management unit configured to manage request-related information items of a user profile, and to process a request received from the external device, the request including a request-related information item, the request-related information item being transmitted to a data repository by the request-related information management unit for obtaining an identification of a document path from the data repository in response;

a request-related information activation unit causing the external device to perform processing related to a processing request through the communication device, and configured to create and activate a new root document folder within the hierarchical organization of information, the new root document folder corresponding to the document path of the request-related information item of the request, in the user profile, upon determination that the root document folder does not exist in the user profile; and a display data creation unit configured to create a display page including a user interface which includes the request-related information item as a component of the document path and the activated root document folder.

* * * * *